Sept. 14, 1926.
J. MASTRIANI ET AL
SIGNAL
Filed Sept. 15, 1924
1,599,577
2 Sheets-Sheet 2
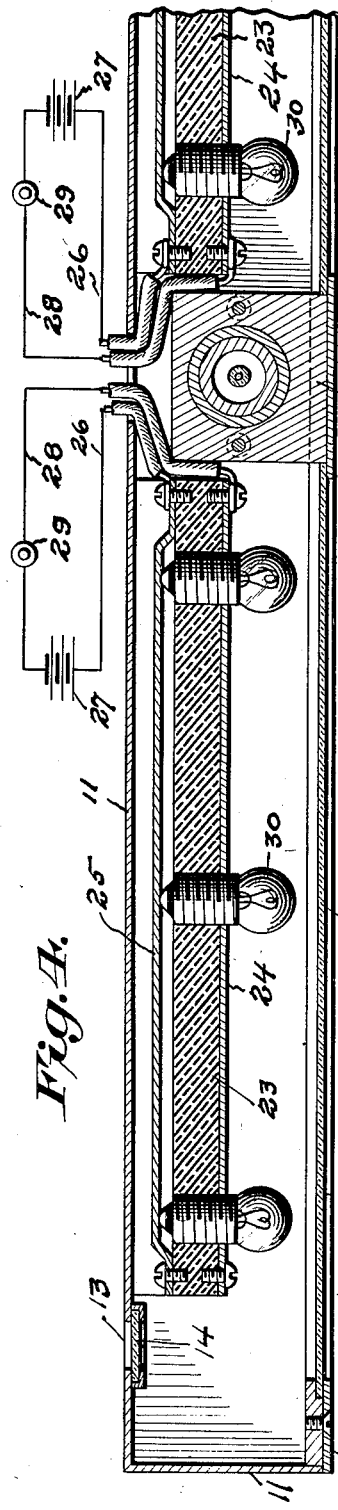
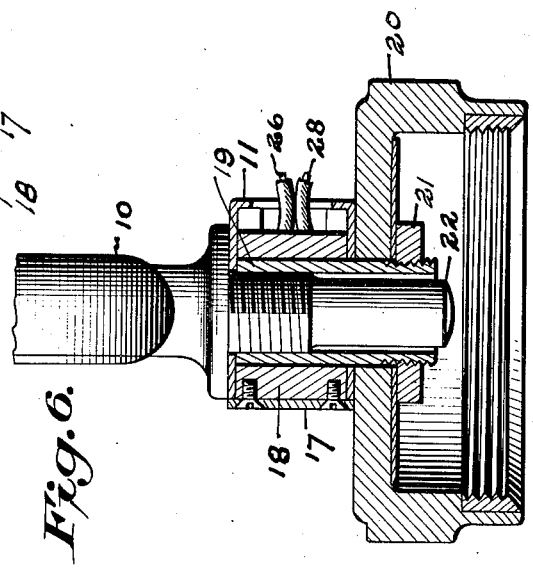
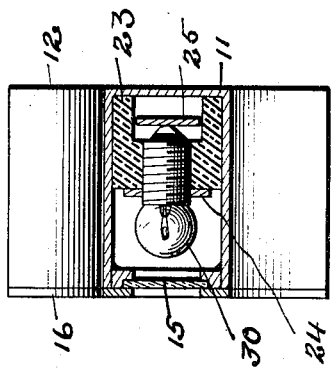

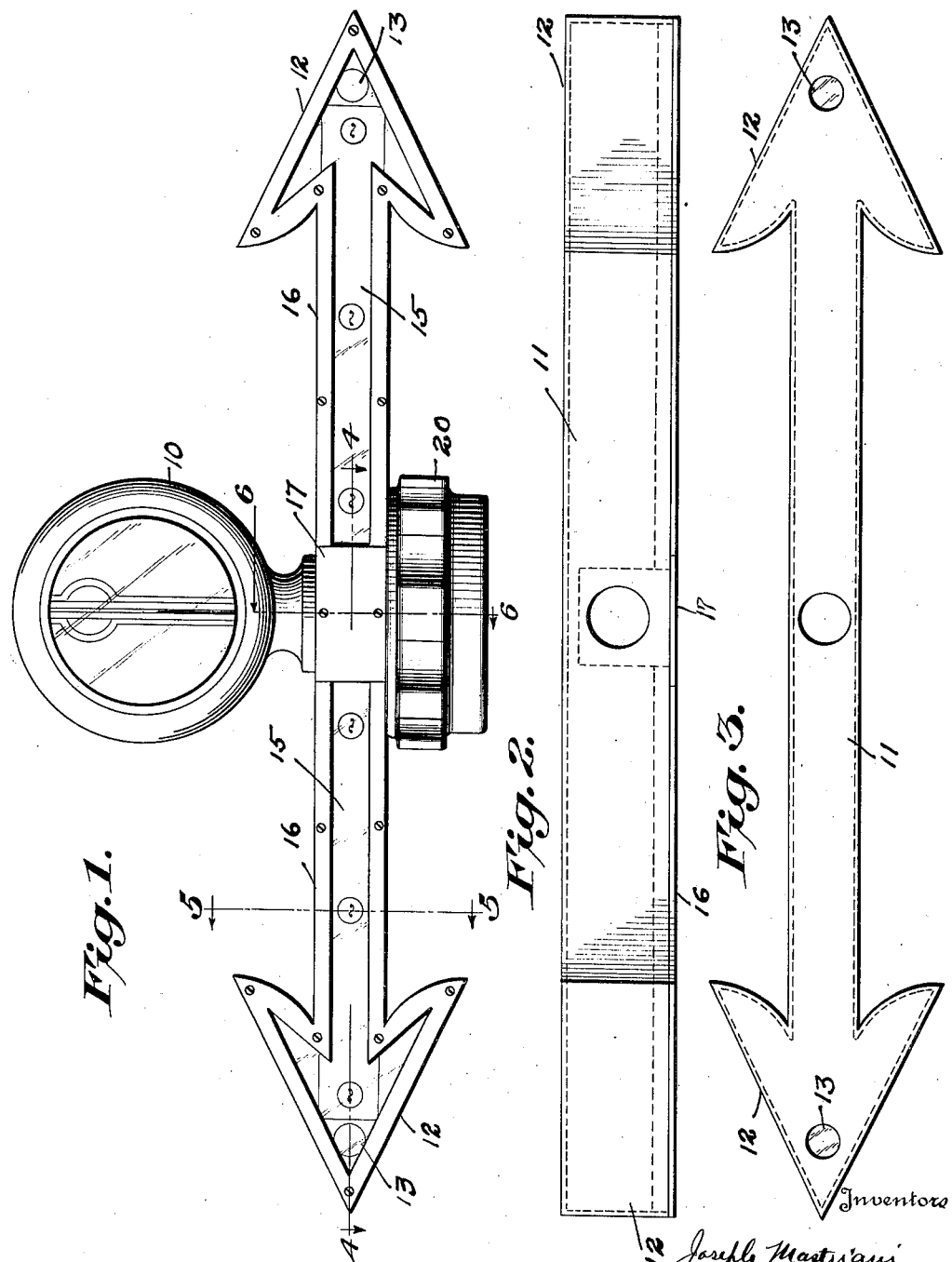

Patented Sept. 14, 1926.

1,599,577

UNITED STATES PATENT OFFICE.

JOSEPH MASTRIANI, JOSEPH TENEDINE AND JOHN TENEDINE, OF NORTH HAVEN, CONNECTICUT.

SIGNAL.

Application filed September 15, 1924. Serial No. 737,842.

This invention relates to a new and improved signal device for attachment to a motor vehicle, which by a system of display lights is designed to indicate the direction in which the motor vehicle is about to move.

It is the object of this invention, among other things, to produce a device of this character that may be manufactured at the minimum cost, may be readily attached or detached to a motor vehicle and will be most efficient in its operation.

To these, and other ends, our invention consists in the signal device having certain details of construction and combinations of parts, as will be hereinafter described and more particularly pointed out in the claim.

Referring to the drawings, in which like numerals of reference designate like parts in the several figures:

Figure 1 is a front elevation of our improved device;

Figure 2 is a plan view thereof;

Figure 3 is a rear view thereof;

Figure 4 is an enlarged fragmentary sectional view thereof, taken generally upon line 4—4 of Figure 1;

Figure 5 is an enlarged sectional view thereof, taken generally upon line 5—5 of Figure 1; and Figure 6 is a transverse sectional elevation thereof with some of the parts adjacent thereto, taken generally upon line 6—6 of Figure 1.

In the drawings our improved device is shown as associated with a motor meter 10 but it may be connected with a motor vehicle in any other convenient or desired manner.

In the embodiment of our invention, we provide a casing 11, which is substantially rectangular in cross section and terminates at its opposite ends in the arrow heads 12, through the rear of which are the test openings 13, each being closed by a transparent plate 14, of glass, celluloid or the like.

Within the casing, between the ends thereof, is a block 18, having a sleeve 19 therein which projects downwardly through the radiator cap 20, and has a nut 21 upon the end thereof. Into this sleeve is threaded the shank 22 of the motor meter.

The casing is open on its front side, and partially rabbeted, as shown, which opening is covered on opposite sides of the motor meter 10 by the transparent plate 15, of glass, celluloid or the like, held within the said rabbeted portion of the casing by the rim plates 16 and intermediate plate 17.

Fixed within the casing are the plates 23 and upon opposite sides thereof are the plates 24 and 25, which are preferably held so that there is an open space between the plates 23 and 25. Each of the plates 25 is connected by a wire 26 with a battery 27 suitably located and the plates 24 by a wire 28, also connected with the same battery and having a push button switch 29 connected therewith.

Separably secured in the plates 24 and 23 are a plurality of incandescent lamps 30, which contact at their inner end with the plate 25.

When mounted on a motor vehicle the push buttons 29 are arranged on the dash steering wheel, or the part adjacent to the operator of the car and as he manipulates either one of the push buttons 29 the circuit is closed and a current of electricity from the battery 27 passes through the lamps 30 upon the same side of the center of the signal as the manipulated push button is erected, so that from the front, facing the device, as shown in Figure 1, one side only of the signal is lighted. As thus displayed, a traffic officer knows by reason of the position of the arrow of light displayed the direction in which the car is about to go.

The operator of the motor vehicle always determines whether the device is operating properly by reason of the test openings 13.

There are minor changes and alterations in the details of our invention that may be made, aside from those suggested, and we would therefore have it understood that we do not limit ourselves to the exact construction herein shown and described, but claim all that falls fairly within the spirit and scope of the appended claim.

Having described our invention, what we claim as new and desire to secure by Letters Patent, is:—

In a signal, a casing, a central block in the casing, extending between the upper and lower walls, said walls and block being apertured to receive a supporting means, a transparent plate on each side of the block extending over front portions of the casing, the front edges of said walls being rabbeted to receive the said transparent plates, a plate common to each of the transparent plates secured to the front face of the block and engaged at its ends over the inner ends of the respective transparent plates which in part secure the latter in position, means engaging the said rabbeted edges and the sides and opposite ends of the transparent plates to secure the same in position, and lamps in the casing.

In testimony whereof we have hereunto affixed our signatures.

JOSEPH MASTRIANI.
JOSEPH TENEDINE.
JOHN TENEDINE.